United States Patent Office 2,866,827
Patented Dec. 30, 1958

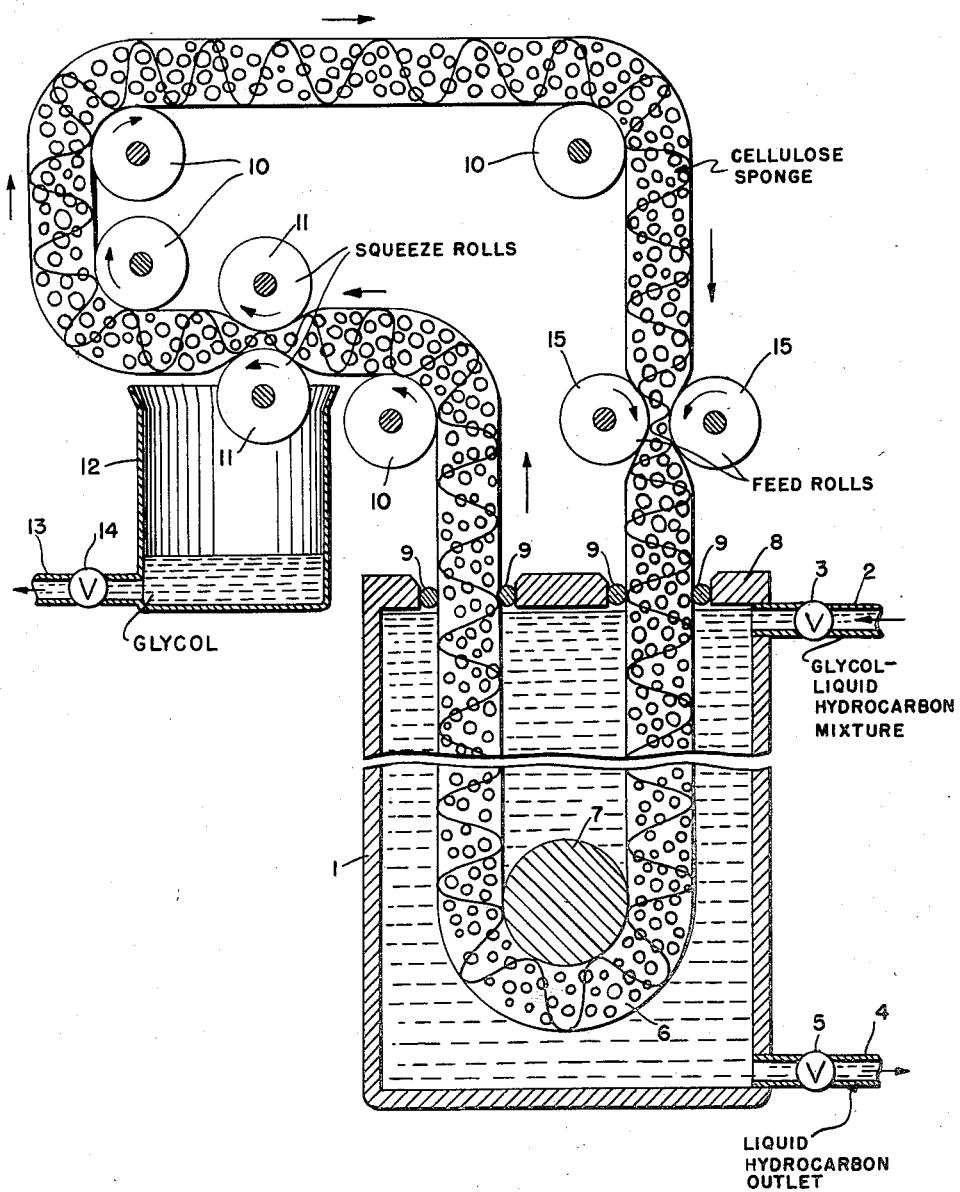

2,866,827

PROCESS FOR THE RECOVERY OF GLYCOLS FROM LIQUID HYDROCARBONS

Wolfgang Jurgeleit, Obernburg (Main), and Erhard Siggel, Laudenbach (Main), Germany, assignors to Vereinigte Glanzstoff-Fabriken AG., Wuppertal-Elberfeld, Germany Application April 24, 1956, Serial No. 580,401

Claims priority, application Germany April 28, 1955

5 Claims. (Cl. 260—637)

This invention relates to a process and apparatus for the recovery of glycols from liquid hydrocarbons, and more particularly to the selective adsorption of glycols from liquid hydrocarbons. The invention is particularly advantageous in its application to the recovery of ethylene glycol from liquid hydrocarbons by selective adsorption.

Adsorption processes have generally found industrial application in the selective recovery of certain components of gas mixtures. For example, air can be dried by passing it over silica gel, or benzol vapor can be recovered from gaseous mixtures by selective adsorption on activated carbon. Adsorption processes have found a much smaller area of industrial application in the separation of fractions from liquid mixtures, one example being the removal of color bodies from liquids by adsorption on activated carbon. Also, water is removed from hydrocarbons such as benzol, toluol, naphtha, transformer oil, etc., by selective adsorption, the adsorbent generally being a material commonly used in the laboratory, such as dehydrated calcium chloride, activated aluminum oxide, dehydrated gypsum, silica gel, fuller's earth, and the like. The phenomenon of selective adsorption is otherwise seldom applied to the separation of fractions of liquid solutions or suspensions.

One object of the present invention is to provide a process for the recovery or separation of a glycol from a liquid hydrocarbon by selective adsorption.

Another object of the invention is to provide a selective adsorption process which gives an efficient separation by employing a novel adsorption media.

Yet another object of the invention is to provide a process for the recovery of a glycol from a liquid hydrocarbon by selective adsorption in which the adsorption media is not readily exhausted and has a greater capacity for adsorption as compared with commonly used adsorbents.

Still another object of the invention is to provide a continuous process of selective adsorption.

Another object of the invention is to provide novel apparatus by which a continuous process of selective adsorption can be accomplished.

These and other objects and advantages of the invention will be more completely understood upon a consideration of the following disclosure and the drawing in which:

Fig. 1 is a cross-sectional side elevation, partly in diagrammatic form, of one embodiment of an apparatus for the recovery of glycols from liquid hydrocarbons.

In accordance with the present invention, it has now been found that a glycol can be recovered from a finely dispersed mixture of a glycol in a liquid hydrocarbon by contacting the mixture with a cellulose adsorbent for selective adsorption of the glycol thereon. The process of the invention is particularly suitable for the separation of ethylene glycol dissolved or suspended in a liquid hydrocarbon. Other glycols which can be recovered by the process of the invention include also other liquid dihydric alcohols, for example diethylene glycol, propylene glycol, 1.2-, 1.3-, or 1,4-butanediol, 2-ethyl-1.3-hexanediol etc.

Either natural or regenerated cellulose can be used as an adsorption medium, and, as with all adsorption processes, it is particularly advantageous to utilize cellulose in forms which have a large surface area and consequently good adsorption properties. For example, cellulose can be employed as filter paper rings similar to Raschig rings, balls of cellulose wadding, voluminous tablets, or viscose sponges. Cellulose in the form of a viscose sponge is especially advantageous as will be more fully explained hereinafter.

The process of the present invention is particularly useful in conjunction with a process for regeneration of terephthalic acid dimethyl ester from polyethylene terephthalate as disclosed in the copending application of Erhard Siggel and Karl Macura, filed March 19, 1956, Serial No. 589,355. The process as described in the copending application yields a reaction product which includes a mixture of ethylene glycol finely dispersed in a liquid hydrocarbon. One object of the present invention is to provide a method of separating the ethylene glycol from this reaction product. The liquid hydrocarbons cited in the copending application and which are suitable for the purpose of the present process include tetrahydronaphthalene, decahydronaphthalene, diphenyl, diphenyl methane, diphenyl ether, α-methylnaphthalene, and β-methylnaphthalene. It is understood, however, that the present invention is equally applicable to a large number of liquid hydrocarbons which can be identified as forming a finely dispersed mixture with a glycol, such as ethylene glycol, whereby a cellulose adsorbent will selectively adsorb the glycol from the mixture. The property or ability of cellulose to selectively adsorb a glycol can thus be applied to additional liquid hydrocarbons by routine experimentation. Other suitable liquid hydrocarbons contemplated by the invention include xylene, toluene, benzene, diethyl-benzene, and other liquid aromatic hydrocarbons; heptane, octane, nonane, and other aliphatic hydrocarbons; alicyclic hydrocarbons as cyclohexane, methyl cyclohexane, cyclopentane etc.; or mixtures of these hydrocarbons, respectively.

Also, in accordance with the invention, novel apparatus is provided for the continuous recovery of a glycol from a finely dispersed mixture of a glycol in a liquid hydrocarbon which includes a container for the mixture, a continuous cellulose or viscose sponge adapted to be moved in a continuous path through the mixture and externally thereof, means to move the sponge in its continuous path, and means external of the mixture to press the sponge for recovery of adsorbed glycol.

Referring now to the drawing, Fig. 1 illustrates a continuous process for the adsorption of a glycol from a finely dispersed mixture of a glycol in a liquid hydrocarbon. An elongated container or adsorption tower 1 is provided with an inlet 2 controlled by a valve 3 for admission of the finely dispersed mixture of a glycol in a liquid hydrocarbon. The mixture passes downwardly through the container 1 and is removed through an outlet 4 controlled by a valve 5. The container is substantially filled with the mixture as the process is carried out.

A continuous cellulose or viscose sponge 6 in the form of a relatively wide and voluminous band moves in a continuous path through the mixture in the container 1 and externally thereof. The continuous sponge 6 is guided in its continuous path by a plurality of guide rollers including a reversing guide roller 7 located centrally near the bottom of the container 1 and adapted to receive the cellulose sponge band 6 in sliding or rolling contact as the band reverses its direction while passing through the container. The top 8 of the container 1 is provided with openings or slots for entry and exit of the continuous band sponge into and from the interior of the container, the top guide rollers 9 adapted to guide the band without exerting pressure thereon and without removing any glycol. The external guide rollers 10 are adapted to guide the continuous sponge band throughout its external continuous path.

A pair of press or squeeze rollers 11 exerts sufficient pressure upon the sponge to remove the adsorbed glycol which then flows into the vessel 12. The glycol which is collected in vessel 12 is removed through line 13 controlled by valve 14. The squeeze rollers 11 are motivated by any suitable means (not shown) so that they rotate in the direction indicated by the arrows, and the pressure exerted on the continuous sponge band is also sufficient to frictionally engage the band for movement in its continuous path as indicated. A pair of feed rollers 15 are approximately synchronized with the squeeze rollers 11 so as to provide an additional moving force to the continuous sponge band. The speed of the squeeze rollers and feed rollers is synchronized so that the length of continuous band located between these rollers and passing through the mixture is not stretched or compressed but is maintained in an expanded or loose condition as it passes through the mixture. If desired, the circumferential surface of the feed rollers and squeeze rollers can be provided with projections for added frictional engagement with the continuous sponge band to aid in its movement.

In the operation of the apparatus, the finely dispersed mixture of glycol in a liquid hydrocarbon enters the container 1 through line 2 and the glycol is adsorbed on the sponge 6 as the mixture passes through the container to the outlet 4. The sponge carrying adsorbed glycol passes out of the container and through the squeeze rollers 11 which substantially remove adsorbed glycol by pressing the sponge. After being pressed or squeezed, the sponge is again capable of adsorbing additional glycol and is redirected in its continuous path by the rotary force of the feed rollers 15 and squeeze rollers 11 to re-enter the container. It is understood that the apparatus illustrated is only one possible embodiment of the invention and that changes can be made in the number and relation of the various parts and in their shape and arrangement without departing from the spirit of the invention. Thus, a plurality of continuous sponge bands can be employed in a single container. Also, a series of squeeze rollers can be utilized in order to apply an increased amount of pressure to the sponge so as to fully press out adsorbed glycol. The apparatus can be adapted to concurrent flow of the cellulose sponge band with the liquid mixture or to countercurrent flow or a combination of both as illustrated by the drawing.

It will be noted that the apparatus defined hereinabove permits a true continuous adsorption process to be carried out in that not only does the glycol-liquid hydrocarbon mixture pass continuously through the adsorption tower or container, but also the continuous cellulose sponge band circulates through the mixture and is pressed to remove the adsorbed glycol so as to provide a "regeneration" of the adsorption medium. Thus, a glycol can be continuously removed from a liquid hydrocarbon without exhausting the adsorption medium.

In addition to the apparatus illustrated herein, the process of the invention can also be carried out in any of the well known adsorption towers. Likewise, extraction columns can also be used in which a cellulose adsorbent is introduced instead of the usual extraction material. Where an adsorption tower is to be packed with a cellulose adsorbent, the cellulose is advantageously in the form of a shaped body which has a large surface area, such as filter paper rings, balls of cellulose wadding or voluminous tablets as well as viscose sponges. As in all adsorption processes, it is important that the glycol-containing solvent not only flows through the cellulose material, as, for example, through a closed layer of filter paper, but also that it is forced to flow in a path along the largest possible surface area of a shaped cellulose body. After completion of the adsorption process, the glycol can be easily recovered by pressing or squeezing the cellulose material. The glycol can also be extracted with water or methanol and the resulting mixtures separated by fractional distillation. In addition, the glycol adsorbed on the cellulose can be recovered by heating the glycol-containing cellulose bodies under a vacuum or normal pressure to distill off the glycol.

A cellulose adsorbent in the form of a cellulose or viscose sponge is particularly advantageous where a packed tower is used as well as being advantageous in providing a continuous process as illustrated above. A viscose sponge retains its shape in a packed adsorption tower and does not disintegrate, even under relatively large flow speeds, so that small pieces of the adsorbent do not break loose to cause clogging of pipes. Because of the large surface area presented by a viscose sponge, the time required for the adsorption is short, thereby resulting in a marked advantage in an industrial application of the process.

In order to provide a good adsorption effect, a viscose sponge is first preferably dried to a low water content of about 4% moisture content or less. Severe drying may cause crusting and hardening of the viscose sponge but this can be prevented if the viscose sponge is previously treated with a 5% to 10% solution of glycol or glycerine in water. The sponge then remains soft and voluminous after drying and has a good adsorption effect for glycol. After pressing or squeezing the excess moisture from the viscose sponge, drying is conveniently accomplished by spreading the sponge on shelves in the air. In about two days the moisture content is generally below 4%.

The following examples further illustrate the invention in the use of various forms of a cellulose adsorbent and their comparison with each other and with other commercially available adsorbents. The examples are illustrative only.

*Example 1*

A tower 50 cm. high and having an inside diameter of 6 cm. was filled with 80 g. of cellulose in the form of a filter flake material. A mixture of 0.2% ethylene glycol dispersed in tetrahydronaphthalene was passed through the tower at a speed of one liter per minute and under a pressure of 2 to 2.2 atmospheres. The filter flakes were mixed with glass rings in order to prevent clogging. The discharged liquid had a glycol content below 0.003%. The adsorbent in the tower was still not exhausted after 180 liters of the solution had passed through.

*Example 2*

A tower 53 cm. high having an inside diameter of 3.7 cm. was filled with 30 g. of chemically pure cotton wadding and a mixture of 0.5% ethylene glycol dispersed in tetrahydronaphthalene was passed through the tower at a speed of 150 ccm. per minute. The glycol content of the discharged liquid at the beginning of the adsorption was less than 0.003%. After passage of 20 liters, the glycol content in the discharged material was 0.02%, and after 30 liters, 0.045%. After 36 liters the tower was exhausted and no more glycol was adsorbed.

*Example 3*

A tower 55 cm. high having an inside diameter of 4 cm. was filled with 185 g. of pressed cellulose plates in the form of slivers. A 1% ethylene glycol dispersion in tetrahydronaphthalene was passed through the tower at a speed of one liter in 10 minutes. The glycol content of the discharged liquid at the beginning of the run was about 0.01% and increased to 0.03% after passage of 25 liters. After passage of about 30 liters, the tower was exhausted.

*Example 4*

The usefulness of cellulose in the form of a viscose sponge was determined by comparison with cellulose in the form of a filter flake material as follows. Two adsorption towers, each 50 cm. high and having an inside diameter of 6 cm., were filled in one case with 91 g. viscose sponge and in the other case with 42 g. filter flake material. The filter flake material was mixed with glass Raschig rings in order to give it a certain permanence of form. A 1% ethylene glycol dispersion in tetrahydronaphthalene was passed through each tower at a speed of 250 ccm. per minute. At regular time intervals the glycol content of the discharged tetrahydronaphthalene was determined as set forth in the following table:

| Amount of Liquid Mixture Passed In Liters | Percent Glycol After Passage Through Viscose Sponge | Percent Glycol After Passage Through Filter Flake |
|---|---|---|
| 1 | 0.003 | 0.004 |
| 4 | 0.003 | 0.004 |
| 8 | 0.004 | 0.008 |
| 12 | 0.004 | 0.01 |
| 16 | 0.005 | 0.02 |
| 20 | 0.004 | 0.02 |
| 24 | 0.004 | 0.03 |
| 28 | 0.01 | 0.035 |
| 32 | 0.01 | 0.04 |
| 36 | 0.02 | 0.06 |
| 40 | 0.03 | 0.1 |
| 44 | 0.03 | 0.2 |
| 48 | 0.045 | |
| 52 | 0.045 | |

The tower was filled with a viscose sponge adsorbent was exhausted after passage of about 52 liters of the glycol-containing tetrahydronaphthalene (1% glycol). With the filter flake material, the tower became exhausted after about 32 liters, thus demonstrating a more favorable adsorption by the viscose sponge, other conditions being equal.

*Example 5*

The effectiveness of a cellulose adsorbent as compared with other well known adsorption media, such as aluminum oxide, activated carbon, silica gel and the like, was determined as set forth in the following table which shows the maximum quantities of glycol which are adsorbed by 10 g. of adsorption material at 20° C. when a 2% suspension of glycol in tetrahydronaphthalene flows through the adsorbent.

| 10 g. Adsorption Medium | Glycol Adsorbed |
|---|---|
| Silica gel, commercial | About 5.8 g. |
| Activated carbon | About 0.7 g. |
| Aluminum oxide, activated, powdered | About 2.3 g. |
| Cellulose, unbleached | About 15.16 g. |
| Filter paper in slivers | About 21.8 g. |
| Filter flakes | About 120.0 g. |

As in all adsorption media, it is advantageous to provide the adsorbent in a finely distributed form which will present a larger surface area and consequently a larger adsorption effect. Thus, the unbleached cellulose in the above table is relatively solidly pressed and therefore presents the least surface area. The filter paper in slivers is more finely distributed while the filter flakes have the greatest distribution and thus provide the best adsorption properties. Nevertheless, the above table clearly illustrates that cellulose, even in its least favorable form, has an adsorption effect several times larger than other known adsorption media. Silica gel had the best adsorption properties of all commercially available products of this kind which were tested but is clearly demonstrated to be less effective than a cellulose adsorbent.

Adsorption media other than cellulose are also distinguished in that, for example, activated carbon adsorbs only very small quantities of glycol. Although silica gel adsorbs relatively more glycol, it has the unpleasant property that the hydrocarbons form resins, probably due to a catalytic effect, which results in a brown coloration. Furthermore, the ease with which glycol can be recovered from a cellulose adsorbent by pressing or squeezing is not possible with prior adsorbents which are hard, granular materials.

The invention is hereby claimed as follows:

1. An improved process for the recovery of a glycol from a finely dispersed mixture of a glycol in a liquid hydrocarbon which comprises contacting said mixture with a cellulose adsorbent for selective adsorption of said glycol thereon.

2. An improved process for the recovery of ethylene glycol from a finely dispersed mixture of ethylene glycol in a liquid hydrocarbon which comprises contacting said mixture with a cellulose adsorbent for selective adsorption of said ethylene glycol thereon.

3. An improved process for the recovery of ethylene glycol from a finely dispersed mixture of ethylene glycol in a liquid hydrocarbon which comprises contacting said mixture with a cellulose adsorbent in the form of a viscose cellulose sponge for selective adsorption of said ethylene glycol thereon.

4. An improved process for the recovery of ethylene glycol from a finely dispersed mixture of ethylene glycol in a liquid hydrocarbon selected from the group consisting of tetrahydronaphthalene, decahydronaphthalene, diphenyl, diphenyl methane, diphenyl ether, α-methylnaphthalene, and β-methylnaphthalene which comprises contacting said mixture with a viscose cellulose sponge adsorbent for selective adsorption of said ethylene glycol thereon.

5. An improved continuous process for the recovery of a glycol from a finely dispersed mixture of a glycol in a liquid hydrocarbon which comprises contacting said mixture with a viscose cellulose sponge for selective adsorption of said glycol thereon, removing said sponge from contact with said mixture, pressing said sponge to recover said glycol, and repeating the aforementioned steps.

References Cited in the file of this patent

UNITED STATES PATENTS

| 2,222,828 | Guthrie | Nov. 26, 1940 |
| 2,678,132 | Beard | May 11, 1954 |
| 2,743,818 | Higuchi | May 1, 1956 |

OTHER REFERENCES

Muendl et al.: Ind. and Eng. Chem., vol. 47, No. 3, pp. 374 to 379, March 1955.